United States Patent [19]
Kwasnitschka

[11] 3,785,477
[45] Jan. 15, 1974

[54] CONVEYING SYSTEM
[75] Inventor: Karl Kwasnitschka, Donaueschingen, Germany
[73] Assignee: Joachim Erbprinz Zu Furstenberg, Donaueschingen, Germany
[22] Filed: Dec. 23, 1971
[21] Appl. No.: 211,409

[30] Foreign Application Priority Data
Dec. 29, 1970 Germany.................. P 20 64 178.5

[52] U.S. Cl............................... 198/218, 198/106
[51] Int. Cl............................................ B65g 25/04
[58] Field of Search..................... 198/219, 218, 106

[56] References Cited
UNITED STATES PATENTS
3,265,195   8/1966   Ford .................................. 198/218
3,554,388   1/1971   Thompson .......................... 198/219

FOREIGN PATENTS OR APPLICATIONS
1,104,984   4/1961   Germany ........................... 198/218

Primary Examiner—Richard E. Aegerter
Attorney—Michael S. Striker

[57] ABSTRACT

A conveying system for transversely conveying logs has two conveyors which are arranged sequentially. The first conveyor has two or more transversely spaced guides each having a first portion which is upwardly inclined in the conveying direction and a second portion downwardly inclined from the downstream end of the first portion, also in the conveying direction. A second conveyor is similar to the first conveyor and its first portion receives conveyed logs from the second portion of the first conveyor. Engaging or conveying elements are mounted on these guides for movement in the conveying direction and for return movement, and each of these elements can be individually advanced at a rate which can be selected for it and in forward or reverse direction, independently of the others.

7 Claims, 2 Drawing Figures

CONVEYING SYSTEM

BACKGROUND OF THE INVENTION

The present invention relates generally to a conveying system, and in particular to a conveying system for conveying logs and analogous elongated articles in direction transversely to their elongation.

In certain instances it is necessary to convey elongated elements in direction transversely to their elongation. A good example of this is in the conveying of logs in a sawmill or a similar application, and the invention will hereafter be described with respect to such an application although it should be understood that the invention is not limited to such an application. In a sawmill or an analogous installation the purpose of a conveying system of the type here under discussion is to receive the logs and to convey them to a transfer point where are they are to be transferred to another system. It is essential that the logs which have been conveyed in direction transversely to their elongation be yielded at the transfer point individually to the other conveying system on which they are to be conveyed lengthwise, usually to a stationary bark removing apparatus. Conveying systems of the type which receive the logs and advance them to yield them individually, and which during the conveyance advance the logs transversely to the elongation thereof, are known as "transverse conveyors" with which term the prior art and the system according to the present invention will hereafter be described.

One transverse conveyor known from the prior art utilizes a single conveyor unit having a plurality of spaced engaging elements which are jointly driven and advanced in the conveying direction. The problem with this known construction resides in the fact that there is no assurance that the transversely conveyed logs will be individually yielded at the outlet end of the conveyor, especially if the logs are of fairly widely varying diameters, if they are not straight in their growth, or if they have been deposited on the conveyor in an angled position. Furthermore, the known conveyor in this case always moves a relatively large number of logs simultaneously up an inclined plane, requiring therefore substantial forces for effecting such movement and not only necessitating the generation of such forces but also making the individual yielding of the logs at the outlet end of the conveyor still more difficult.

A further transverse conveyor known from the art utilizes a horizontal feed table on which the logs to be supplied to the conveyor must be individually deposited. When deposited on this feed table they are engaged by continuously advancing conveyor chains and advanced to the end of the feed table. Of course, the time required for depositing a load of logs on the feed table —for instance off a vehicle which has brought the load to the table— is determined by the advancement speed of the conveyor chains on the feed table and experience has shown that the off-loading of a load of logs from a conventional log transporter requires approximately an hour with this arrangement. Furthermore, when the logs reach the end of the feed table they then arrive at the transverse conveyor which utilizes a first conveyor unit having continuously advancing conveyor chains and supplying the logs to a second conveyor unit which is similar to the first one, with both conveyor units advancing the logs in upward direction to the respective outlet end of the conveyor unit. The purpose of this arrangement is to supply the logs individually at the outlet end of the second conveyor unit. It has been found, however, that this is reliably assured only if the logs are supplied individually to the first conveyor unit from the feed table. Frequently, however, two logs together will be supplied off the feed table to the first conveyor unit in which case the entire installation must be shut down in order to separate the two logs manually, with the aid of a crane, winch or the like so that on restarting of the system they will be supplied individually at the outlet of the system. Of course, this requires that at least two operators be available at all times because a single operator cannot perform the work which is necessary in case such a difficulty should occur.

Moreover, in this second type of transverse conveyor it is very difficult to straighten any logs which have become deposited on the first conveyor unit in an inclined condition, that is which do not extend more or less normal to the direction of conveyance. This is possible only with the aid of a crane and thus represents a major difficulty. Furthermore, difficulties also arise if the logs are either of relative small or relatively large diameter, or if they are not of straight growth.

SUMMARY OF THE INVENTION

It is accordingly a general object of the present invention to provide a conveyor system of the type here under discussion which is not possessed of the disadvantages of the prior art.

More particularly it is an object of the present invention to provide such a conveyor system which permits the supply of logs or analogous objects to the system at any desired rate of speed.

An additional object of the invention is to provide such a conveyor system which assures that at the outlet end of the system the objects are yielded individually even if the logs are not grown straight, if they are very long, if they are very thin or very thick.

Still a further object of the invention is to provide such a conveyor system in which logs which do not extend substantially normal to the direction of conveyance while on the system, can be moved to such a position without difficulty.

In pursuance of these and other objects which will become apparent hereafter, one feature of the invention resides in a conveying system for conveying logs and analogous elongated objects in direction transversely to their elongation. This system, briefly stated, comprises a first conveyor having at least two transversely spaced guides each including a first portion inclined upwardly in conveying direction, and a second portion extending from a downstream end of the first portion and inclined downwardly in conveying direction. A second conveyor similar to the first conveyor is arranged so that the first portion of the second conveyor receives objects from a downstream end of the second portion of the first conveyor. A plurality of individual conveying elements are movable on the guides of the conveyors for engaging objects and conveying them. Means are provided for moving each of the conveying elements individually on their respective guide at selectable speeds and directions.

A supply unit supplies the objects, for instance logs, to the inlet end of the first portion of the first unit and is provided for this purpose with a moderately inclined surface on which the logs will slide downwardly to the inlet end. This supply unit can be loaded with logs at any desired speed, thus making it possible to quicken the loading process —and thus the off-loading process from a log transporter—substantially. Furthermore, it is not necessary to supply logs individually to the supply unit because the conveying elements of the first portion of the first conveyor will almost always engage a single log —very rearely two simultaneously—of a pile of logs on the inclined plane. Furthermore, the means for moving the conveying elements is in form of hydraulic cylinder and piston means according to the present invention, thus providing without any difficulty the necessary forces for moving the logs easily.

The second conveyor assures the reliable individual supply of logs to whatever unit is to receive the logs, for instance a longitudinal conveyor which is to advance them in longitudinal direction. The inclination of the first and second portions of the second conveyor is advantageously somewhat steeper with reference to the horizontal than that of the first and second portions of the first conveyor, further improving the individual supply of the logs at the outlet end of the second conveyor.

The individual control of the conveying elements assures that logs which are not so located on the conveyors that they extend properly transverse to the conveying direction, or logs which are not straight in their growth, can be adjusted as necessary or desired, and it is even possible to rapidly reverse the direction of movement of an individual one of the engaging elements in order to obtain the necessary orientation of the logs, for instance by "shaking" the logs. Moreover, by making it possible to advance the individual engaging elements at individually controllable speeds, the operation of the novel system can be very readily accommodated to the operational speed of for instance a bark-removing machine to which the logs are being supplied.

It is advantageous that the engaging elements each have an engaging surface which is inclined downwardly and forwardly in the conveying direction to include an obtuse angle with the respective guide, because this assures reliably that even relatively thin or relatively thick logs can be properly conveyed and supplied individually at the outlet end of the second conveyor. The reason for this is, of course, that so oriented engaging surfaces provide a proper and reliable support for logs of whatever thickness or type.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
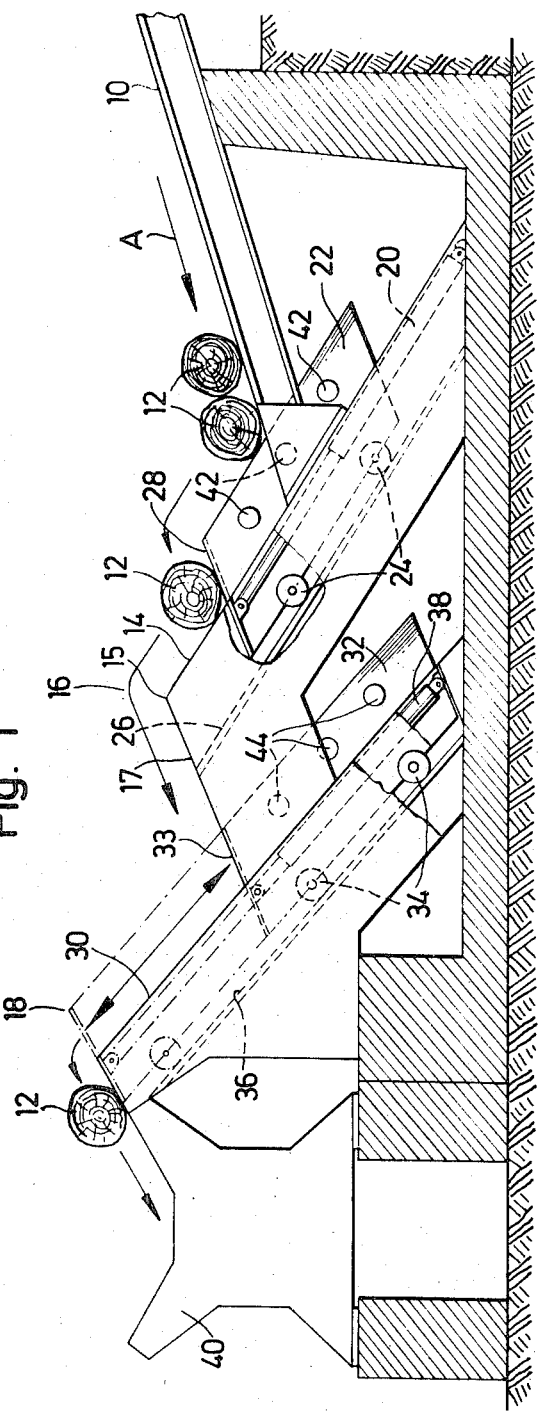
FIG. 1 is a diagrammatic side view of a system according to the present invention.

Discussing the drawing in detail it will be seen that a supply unit is provided having an inclined plane 10 of which FIG. 1 only shows the lowermost end portion. It will be evident that the length of this inclined plane can be selected as desired, so that any desired number of logs 12 can be deposited on this plane. Evidently, the logs 12 will slide down on this plane 10, approximately transverse to the elongation of the logs 12 and in the conveying direction which is identified by the arrow A, until they abut the upwardly inclined first guides 14 of the first conveyor 16 which supplies the logs to the second conveyor 18 arranged downstream of the first conveyor 16.

The drawing shows that the conveyor 16 is provided with four spaced log-engaging elements 22 each of which can be separately advanced at individually controllable speed and in forward or reverse direction by two hydraulic cylinders 20 which cooperate with it. Each of the elements 22 is advanceable in a recess 26 of a guide 14 on wheels 24 and has an upper log-engaging surface 28 which is inclined approximately in correspondence with the inclination of the inclined plane 10. The angle of inclination of the surface 28 with reference to the surface of the guide 14 is an obtuse angle which assures reliable engagement of and retention by the respective element 22 of logs 12, even if they are relatively thin or relatively thick, or if they are of other-than-straight configuration.

At the highest point 15 of the conveyor 16 there is provided a downwardly inclined portion of the conveyor 16 which is identified with reference numeral 17 and is downwardly inclined in the direction A, a construction which substantially facilitates the individualization of supply of these logs 12.

The second conveyor 18 has guides 30 corresponding to the guides 14 of the first conveyor 16, but inclined at a somewhat steeper angle than those in order to further improve the log individualization. The conveyor 18 is also provided with four spaced engaging elements 18 which are here identified with reference numeral 32 and have log engaging surfaces 33, again inclined to the horizontal in the manner described before. The elements 32 advance on wheels 34 in recesses 36 of the guides 30 and each of the elements 32 is individually advanceable at selectable speed and in selectable directions by two hydraulic cylinders 38 which may of course be of any known construction and are not novel per se.

The downstream end of the conveyor 18 supplies the logs to a known longitudinal conveyor, that is a conveyor on which the logs 12 are advanced in direction of their elongation to the non-illustrated bark-removing machine or the like.

Figure 2:
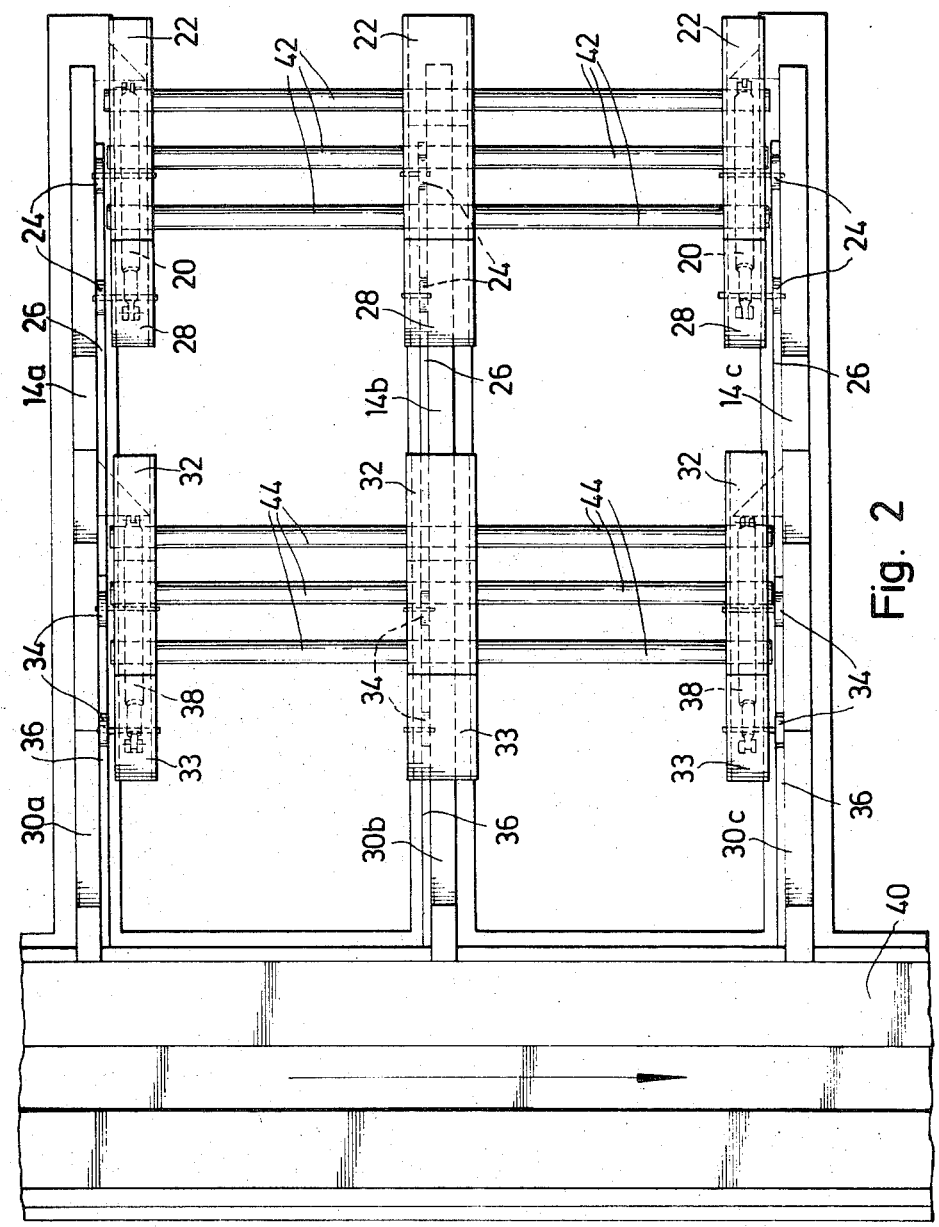
FIG. 2 is a diagrammatic top-plan view of FIG. 1, with the supply unit omitted.

The guides 14 and 30 in the illustrated embodiment are respectively in form of three separate narrow support bands 14a, 14b and 14c on the one hand, and 30, 30a and 30c on the other hand, as shown in FIG. 2. By thus providing only relatively narrow contact for the logs 12 and leaving the space between the respective band or tapes free, the friction with respect to the logs 12 is substantially reduced and their conveyance facilitated.

In this embodiment the depressions ore recesses 26 and 36 in which the wheels 24 and 34 turn, are located adjacent the bands 14a, 14b, 14c and 30a – 30c, respectively, and the elements 22 of the conveyor 16 and those identified with reference numeral 32 of the conveyor 18 are connected by cross members 42 and 44, respectively. This does not prevent the possibility of relative movement of the elements located adjacent one another, because they are articulately connected to these elements precisely with this in mind.

In the illustration of FIG. 1 the elements 22 have just engaged the leading one of the logs 12 resting on the inclined plane 10, with the contact surfaces 28, lifting it to a middle position under the pressure of the upper logs which push against it. As indicated by the arrows in FIG. 1 this engaged log is then lifted to the highest point 15 whereupon it moves on the portion 17 of the guides until it abuts portion 30 of the second conveyor 18 whereupon the elements 32 of the second conveyor engage and lift the log 12 to the upper end or outlet end of the conveyor 18 so that it can roll into the longitudinal conveyor 40.

If as an exception two superimposed logs should be engaged on the inclined plane 10 by the conveyor 16, then it is very simple to so operate the elements 22 that only one of these logs —namely the upper one— will roll onto the guides 30 of the conveyor 18, whereas the lower log is retained by stopping of the elements 22 before it can reach the point 15 and until such time as the first log —the uppermost one— has reached the longitudinal conveyor 40. Thereupon the elements 22 holding the lower log are raised to the point 15 so that the lower log then is supplied to the conveyor 18.

If a log is not located properly on all adjacent elements 22 or 32, that is if it is not located appropriately transversely to the direction of advancement A, then the cylinders 20 or 38 —depending upon which conveyor is involved— are operated in such a manner as to obtain a certain shaking effect which will result in a proper orientation of the log in question. A similar effect is obtainable with respect to logs which are not straight in growth, by operating the cylinders for the different elements to obtain individualism of the logs as they are supplied to the longitudinal conveyor 40.

It will be understood that each of the elements described above, or two or more together, may also find a useful application in other types of construction differing from the types described above.

While the invention has been illustrated and described as embodied in a conveying system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A conveying system for conveying logs and analogous elongated articles in direction transversely to their elongation, comprising a first conveyor having at least two transversely spaced fixed guides each including a first portion inclined upwardly in conveying direction and having an article surface, a second portion extending from a downstream end of said first portion and inclined downwardly in conveying direction, and a plurality of individual conveying elements reciprocable along said first portion of said first conveyor for engaging and conveying articles thereon, means for mounting said conveyor elements on said guides, said conveying elements each having an inclined article engaging surface which extends above said article supporting surface of said first portion; a second conveyor similar to said first conveyor and arranged so that the first portion of said second conveyor receives articles from a downstream end of said second portion of said first conveyor; and moving means including hydraulic cylinder-and-piston units operative for reciprocating each of said conveying elements of the respective conveyors individually at selectable speeds and in selectable direction.

2. A conveying system as defined in claim 1, wherein the respective article engaging surface is inclined downwardly and forwardly in said conveying direction and includes an obtuse angle with the respectively associated guide.

3. A conveying system as defined in claim 1, wherein the inclination of the first and second portions of said second conveyor with reference to the horizontal is steeper than that of said first and second portions of said first conveyor.

4. A conveying system as defined in claim 1; and further comprising supply means for supplying articles to be conveyed to said first portion of said first conveyor.

5. A conveying system as defined in claim 1; and further comprising receiving means for serially receiving conveyed articles from the second portion of said second conveyor.

6. A conveying system as defined in claim 1; and further comprising supply means including a downwardly inclined slide arranged upstream of said first portion of said first conveyor, for supplying articles to be conveyed to said first conveyor.

7. A conveying system for conveying logs and analogous elongated articles in direction transversely to their elongation, comprising a first conveyor having at least two transversely spaced fixed guides each including a first portion which is inclined upwardly in conveying direction and having an article supporting surface and provided with recesses, a second portion extending from a downstream end of said first portion and inclined downwardly in conveying direction, and a plurality of individual conveying elements provided with wheels supported and movable in said recesses, said conveying elements further having inclined article engaging surfaces extending above said article supporting surface of said first portion; a second conveyor similar to said first conveyor and arranged so that the first portion of said second conveyor receives articles from a downstream end of said second portion of said first conveyor; and moving means for individually reciprocating the conveying elements of the respective conveyors.

* * * * *